(12) United States Patent
Trautmann et al.

(10) Patent No.: US 11,619,290 B2
(45) Date of Patent: *Apr. 4, 2023

(54) ASSEMBLY SET FOR TRANSMISSION DEVICES FOR MOTOR VEHICLES

(71) Applicant: AUDI AG, Ingolstadt (DE)

(72) Inventors: Carsten Trautmann, Wolfsburg (DE); Christian Meixner, Ingolstadt (DE); Christian Wirth, Moosinning/Eichenried (DE); Jürgen Tschullik, Berching (DE)

(73) Assignee: AUDI AG, Ingolstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/354,223

(22) Filed: Jun. 22, 2021

(65) Prior Publication Data

US 2021/0310550 A1    Oct. 7, 2021

Related U.S. Application Data

(63) Continuation of application No. 16/641,348, filed as application No. PCT/EP2018/072359 on Aug. 17, 2018, now Pat. No. 11,111,994.

(30) Foreign Application Priority Data

Aug. 25, 2017   (DE) ...................... 10 2017 214 914.0

(51) Int. Cl.
| | | |
|---|---|---|
| *F16H 48/36* | (2012.01) | |
| *F16H 48/11* | (2012.01) | |
| *F16H 48/10* | (2012.01) | |

(52) U.S. Cl.
CPC ............. *F16H 48/11* (2013.01); *F16H 48/36* (2013.01); *F16H 2048/104* (2013.01);
(Continued)

(58) Field of Classification Search
CPC .... F16H 41/11; F16H 48/36; F16H 2048/104; F16H 2048/106; F16H 2048/364;
(Continued)

(56) References Cited

U.S. PATENT DOCUMENTS 10,315,502 B2 *  6/2019  Meixner ................. F16H 3/666
10,962,091 B2 *  3/2021  Trautmann ............. B60K 6/387
(Continued)

FOREIGN PATENT DOCUMENTS

| CN | 106255611 A | 12/2016 |
| DE | 10 2009 056 366 A1 | 6/2011 |

(Continued)

OTHER PUBLICATIONS

Office Action dated Aug. 2, 2022 in corresponding Chinese Application No. 201880055033.2, 12 pages (including English translation).

(Continued)

*Primary Examiner* — Roger L Pang
(74) *Attorney, Agent, or Firm* — Maier & Maier, PLLC

(57) ABSTRACT

An assembly set for transmission devices for motor vehicles. Each of the transmission devices has an input shaft which can be operatively connected to a drive device of the motor vehicle, as well as a first output shaft, and a second output shaft, and has a spur gear differential transmission designed as a planetary transmission, via which the input shaft and an intermediate shaft that is coupled or can be coupled to an electric machine arranged coaxially to the input shaft are coupled to the first output shaft and the second output shaft. The electric machine is coupled to the input shaft in a first shift position of a shift device and to the intermediate shaft in a second shift position of the shift device.

14 Claims, 3 Drawing Sheets

(52) U.S. Cl.
CPC .. *F16H 2048/106* (2013.01); *F16H 2048/364* (2013.01); *F16H 2200/2015* (2013.01); *F16H 2200/2035* (2013.01); *F16H 2200/2094* (2013.01); *F16H 2200/2097* (2013.01)

(58) Field of Classification Search
CPC ..... F16H 2200/2015; F16H 2200/2035; F16H 2200/2094; F16H 2200/2097; F16H 2057/005; F16H 57/033; F16H 2057/0335; B60Y 2400/804; B60K 6/365
USPC .................................... 475/5, 303, 205, 221
See application file for complete search history.

(56) References Cited

U.S. PATENT DOCUMENTS

| 11,111,994 | B2* | 9/2021 | Trautmann | B60K 6/365 |
| 2016/0003337 | A1* | 1/2016 | Smetana | F16H 48/36 |
| | | | | 903/910 |
| 2016/0318419 | A1 | 11/2016 | Gavling et al. | |
| 2020/0240518 | A1 | 7/2020 | Trautmann et al. | |
| 2020/0347917 | A1 | 11/2020 | Trautmann et al. | |

FOREIGN PATENT DOCUMENTS

| DE | 10 2010 036 240 A1 | 3/2012 |
| DE | 10 2010 053 855 A1 | 6/2012 |
| DE | 10 2013 221 180 A1 | 4/2014 |
| DE | 10 2012 220 970 A1 | 5/2014 |
| DE | 10 2013 202 381 A1 | 8/2014 |
| DE | 10 2013 202 382 A1 | 8/2014 |
| DE | 10 2014 204 575 A1 | 9/2015 |
| DE | 10 2014 006 232 A1 | 11/2015 |
| DE | 10 2014 210 549 A1 | 12/2015 |
| DE | 10 2014 016 077 A1 | 5/2016 |
| DE | 10 2017 214 912 A1 | 2/2019 |
| WO | 2016/066732 A1 | 5/2016 |

OTHER PUBLICATIONS

Examination Report dated Jan. 24, 2020 in corresponding German application No. 10 2017 214 914.0; 22 pages including Partial/Human-generated/Machine-generated English-language translation.

International Search Report and Written Opinion of the International Searching Authority dated Nov. 16, 2018 in corresponding International application No. PCT/EP2018/072359; 37 pages including Machine-generated English-language translation.

Notification of Transmittal of Translation of the International Preliminary Report on Patentability dated Mar. 5, 2020, in connection with corresponding international Application No. PCT/EP2018/072359 (10 pgs.).

English translation of DE102012220970A1; http://translationportal.epo.org; Dec. 16, 2020 (Year: 2020).

* cited by examiner

ASSEMBLY SET FOR TRANSMISSION DEVICES FOR MOTOR VEHICLES

CROSS-REFERENCE TO RELATED APPLICATIONS

This application is a continuation of U.S. patent application Ser. No. 16/641,348, filed Feb. 24, 2020, which is a national phase of International Patent Application No. PCT/EP2018/072359, filed Aug. 17, 2018, which claims priority to German Patent Application No. 10 2017 214 914.0, filed Aug. 25, 2017, the entire contents of which are incorporated herein by reference.

FIELD

The disclosure relates to an assembly set for transmission devices for motor vehicles, wherein each of the transmission devices has an input shaft which can be operatively connected to a drive device of the motor vehicle, as well as a first output shaft, and a second output shaft, and has a spur gear differential transmission designed as a planetary transmission, via which the input shaft and an intermediate shaft that is coupled or can be coupled to an electric machine arranged coaxially to the input shaft are coupled to the first output shaft and the second output shaft, wherein the electric machine is coupled to the input shaft in a first shift position of a shift device and to the intermediate shaft in a second shift position of the shift device.

BACKGROUND

The transmission device is used, for example, to transfer a torque between a drive device of the motor vehicle and a wheel axle of the vehicle. The wheel axle is or at least can be operatively connected to the drive device via the transmission device. The wheel axle is accordingly implemented as a driven wheel axle. The axle may be designed as a front axle or as a rear axle of the motor vehicle. The transmission device has the input shaft as well as the first output shaft and the second output shaft.

The input shaft of the transmission device is connected to the drive device of the motor vehicle, preferably via a manual transmission and/or a clutch, particularly a start-up clutch. A transmission ratio selected from several transmission ratios can be set between the drive device and the input shaft of the transmission device by means of the manual transmission. The clutch is preferably designed as a shifting clutch and especially preferably as a start-up clutch. In this regard, the operative connection between the drive device and the input shaft of the transmission device can be established and disengaged as desired with the aid of the clutch.

The drive device has at least one drive unit, which is designed, for example, as an internal combustion engine or as an electric machine. Of course, the drive device may also be implemented as a hybrid drive device and, in this regard, may have several drive units, which are preferably of different type. In this case, one of the drive units is implemented, for example, as an internal combustion engine, or another of the drive units is implemented as an electric machine. If the drive device has several drive units, it is preferably designed such that the drive units, at least sometimes, jointly provide a drive torque directed at driving the motor vehicle.

The input shaft of the transmission device is coupled to both the first output shaft as well as to the second output shaft, particularly permanently, via the planetary transmission. The planetary transmission represents a spur gear differential transmission, i.e. a differential transmission in this respect, which has several spur gears enmeshed with one another. Very generally, the spur gear differential transmission functions as a differential transmission and/or differential gearing.

Publication WO 2016/066732 A1, for example, is known from the prior art. It relates to a transmission device for a motor vehicle, which has an input shaft, which can be operatively connected to a drive unit, as well as a first output shaft and a second output shaft, wherein the first output shaft is operatively connected or can be operatively connected to a first sub-shaft of a wheel axle via a first transmission, and the second output shaft is operatively connected or can be operatively connected to a second sub-shaft of the wheel axle via a second transmission.

SUMMARY

The object of the invention is to propose an assembly set for transmission devices for motor vehicles which has advantages compared to the known assembly sets, particularly which covers a wide range of different transmission devices with a small number of replaceable elements.

This is achieved according to the disclosure with an assembly set for transmission devices. In doing so, it is provided that the electric machine of each of the transmission devices is coupled to a first shifting shaft and a second shifting shaft of the shift device via transmission gearing, which has at least two planetary gear sets that are coupled together, and that the first output shaft and the second output shaft are each coupled to or can be coupled to a respective sub-axle of a wheel axle of the motor vehicle with a transmission ratio which differs among various transmission devices, wherein the planetary gear sets for at least one of the transmission ratios has the same stationary gear transmission ratio in terms of magnitude.

The electric machine can be coupled to the input shaft and/or the intermediate shaft by means of the shift device. The electric machine is used, in particular, to implement a torque vectoring functionality. This is the case provided it is or can be coupled to the intermediate shaft. Alternatively or additionally, the electric machine may be coupled to the input shaft. If the electric machine is coupled to the input shaft, it is used to provide additional torque at the input shaft, which is superposed with the drive torque provided by the drive device. The torque provided by the electric machine may be positive or negative such that, in the end, the electric machine is driven either as an electric motor or as a generator.

The electric machine can be coupled to the input shaft and/or the intermediate shaft by means of the shift device. Preferably, the operative connection between the electric machine and the input shaft and/or the intermediate shaft can thus be established or disengaged as desired with the aid of the shift device. Especially preferably, the shift device is optionally used to decouple the electric machine from both the input shaft and the intermediate shaft, to connect it to the input shaft, or to connect it to the intermediate shaft. Such type of design of the shift device enables an especially flexible use of the electric machine.

Each of the transmission devices has an electric machine and the transmission gearing. The electric machine is respectively coupled to two shifting shafts, namely the first shifting shaft and the second shifting shaft, via the transmission gearing. This means that both shifting shafts are connected in parallel to the electric machine via the transmission gearing. Preferably in this case, a first transmission ratio is present between the electric machine and the first shifting shaft, and a second transmission ratio is present between the electric machine and the second shifting shaft, wherein these two transmission ratios are especially preferably different from one another.

At least one of the two shifting shafts is coupled to the input shaft and/or the intermediate shaft in one of the possible shift positions. For example, the first shifting shaft is coupled to the input shaft in the first shift position and to the intermediate shaft in the second shift position, while the second shifting shaft is coupled to the input shaft, for example, in a third shift position.

The transmission gearing is implemented by means of two planetary gear sets coupled to one another. Preferably, there are two complete planetary gear sets available, wherein the electric machine is preferably directly connected to a transmission element of the first of the planetary gear sets. At least one of the two shifting shafts is coupled to the electric machine via the first planetary gear set and also via a second of the planetary gear sets.

The two output shafts are coupled or at least can be coupled to two sub-axles of the wheel axle of the motor vehicle. In this respect, the first output shaft is coupled or at least can be coupled to a first sub-axle, and the second output shaft is coupled or at least can be coupled to a second sub-axle, preferably rigidly and/or permanently. The same transmission ratio is established for the same transmission device between the first output shaft and the first sub-axle, on the one hand, and the second output shaft and the second sub-axle, on the other hand. However, the transmission ratios should be different for different transmission devices. In this regard, there is a first transmission ratio for a first of the transmission devices between the output shaft and sub-axle and a second transmission ratio for a second of the transmission devices.

For example, the transmission ratios differ between different motor vehicle lines or for different engine types of a motor vehicle series such the transmission devices can be adapted to the respective motor vehicle. In order to achieve an especially simple design of the transmission devices, the standard transmission ratios of the two planetary gear sets of the transmission gearing must be the same in terms of magnitude for at least one of the transmission ratios. In this respect, a first of the planetary gear sets has a first standard transmission ratio and a second of the planetary gear sets has a second standard transmission ratio. The absolute values thereof should be identical for the at least one of the transmission ratios such that the two standard transmission ratios are the same in terms of magnitude.

Especially preferably, the planetary gear sets have the same standard transmission ratios in terms of magnitude for several of the transmission ratios such that the transmission devices as a whole are structured comparatively simply. Especially preferably, it is provided to balance the different transmission ratios of the various transmission devices by means of the planetary gear sets. In this respect, the planetary gear sets are selected such that, with as few changes as possible in the respective transmission device, it is adapted to the respective transmission ratio between the output shafts and the sub-axles.

Preferably, the spur gear differential transmission is designed identically for all transmission devices. This likewise applies to the electric machine and the shift device.

A further embodiment of the invention provides that each of the planetary gear sets has a sun gear, a planetary gear carrier with planetary gear rotatably mounted thereon, as well as a ring gear as a transmission element, and various transmission elements of the planetary gear sets are connected to one another for coupling, for at least two of the transmission ratios. In other words, the first planetary gear set has a first sun gear, a first planetary gear carrier with a first planetary gear, and a first ring gear, while the second planetary gear set has a second sun gear, a second planetary gear carrier with a second planetary gear, as well as a second ring gear. The sun gears, the planetary wheel carriers, and the ring gears are generally characterized as transmission elements within the scope of this description.

In order to couple the planetary gear sets, two transmission elements of the planetary gear sets are connected to one another for each of the transmission devices, i.e. one transmission element of the first planetary gear set is coupled to a transmission element of the secondary gear set, preferably rigidly and/or permanently. It can then be provided that different transmission elements are connected to one another for at least two of the transmission ratios. With a first of the transmission ratios, thus a first transmission element of the first planetary gear set is coupled to a first transmission element of the second planetary gear set. With a second of the transmission ratios, a second transmission element of the first planetary gear set is coupled to a second transmission element of the second planetary gear set. It is provided that the first transmission element is different from the second transmission element, either only for the first planetary gear set, the second planetary gear set, or both planetary gear sets. In this regard, the adaptation of the respective transmission device to the current transmission ratio is achieved, at least partially, through different couplings of the planetary gear sets. This can be implemented in the design with low complexity.

A refinement of the invention provides that, for each of the transmission ratios, the planetary gear carrier of the first planetary gear set is coupled to the sun gear of the second planetary gear set and the second shifting shaft. In order to keep the design complexity as low as possible for adapting the transmission devices to the current transmission ratios, the coupling between the planetary gear carrier of the first planetary gear set and the sun gear of the second planetary gear set should be present in unchanged form for all transmission ratios. In addition, the second shifting shaft is connected to the aforementioned elements. This is also implemented for each of the transmission ratios.

An especially preferred further embodiment of the invention provides that the electric machine is connected to the transmission gearing via the sun gear of the first planetary gear set for each of the transmission ratios. This also results in a comparatively low complexity, because the connection of the electric machine to the transmission gearing is the same for all transmission devices. The electric machine is connected to the transmission gearing such that the electric machine and the sun gear are coupled rigidly and permanently so that they always have the same rotational speed.

A further embodiment of the invention provides that the ring gear of a first of the planetary gear sets is connected to the planetary gear carrier of a second of the planetary gear sets for a first of the transmission ratios and/or a second of the transmission ratios. Such type of design is provided for at least one of the transmission ratios, namely the first transmission ratio. Especially preferably, however, it is implemented for several transmission ratios, namely for the second transmission ratio, in addition to the first transmission ratio. The greater the number of different transmission ratios for which the same design is present, the fewer changes needed to the transmission device for adapting to the respective transmission ratio.

Within the scope of a further preferred embodiment of the invention, it can be provided that the first shifting shaft is coupled to the ring gear of the first planetary gear set and to the planetary gear carrier of the second planetary gear set for the first transmission ratio and/or the second transmission ratio. This embodiment is provided at least for the first transmission ratio, but especially preferably, however, for the second transmission ratio in addition. Accordingly, this results in the same advantages as for the previously described embodiments. The shifting shaft is rigidly and permanently coupled to the ring gear and the planetary gear carrier such that they are also inter-connected accordingly.

A further preferred embodiment of the invention provides that, for a third of the transmission ratios, the first shifting shaft is coupled to the planetary gear carrier of the first planetary gear set. The third transmission ratio is different from both the first transmission ratio and from the second transmission ratio. In this regard, the transmission device for the third transmission ratio has a different design than a transmission device which is configured for the first transmission ratio or the second transmission ratio. For the third transmission ratio, it is then provided that the first shifting shaft is not coupled, for example, to the ring gear of the first planetary gear set and the planetary gear carrier of the second planetary gear set but instead is connected to the planetary gear carrier of the first planetary gear set. An internal change at the transmission gearing, namely a different connection between the first shifting shaft and the transmission gearing, also serves, at this point, as an adaptation of the respective transmission device to the current transmission ratio. Other adaptations to the transmission device are not necessary.

A refinement of the invention provides that the standard transmission ratios are the same for the second transmission ratio and the third transmission ratio in terms of magnitude and that they differ in terms of magnitude for the first transmission ratio. It was specified at the beginning that the planetary gear sets have the same standard transmission ratio in terms of magnitude for at least one of the transmission ratios. According to a preferred embodiment, this is the case for the second transmission ratio and the third transmission ratio, i.e. at least for two transmission ratios. However, the standard transmission ratios should differ in terms of magnitude for the first transmission ratio. In this case, they may differ, however, with respect to the algebraic sign. Especially preferably, the standard transmission ratios have the same algebraic sign, however, at least for the second transmission ratio and the third transmission ratio. This also applies to the first transmission ratio within scope of a further advantageous embodiment.

A further preferred embodiment of the invention provides that at least one of the ring gears of the two planetary gear sets is specified for each of the transmission ratios. This should be understood to mean that the corresponding ring gear is not mounted rotatably but instead is established opposite a transmission housing of the transmission device, i.e. rigidly connected thereto. This is the case for at least one of the ring gears or even both ring gears of the planetary gear sets for each of the transmission ratios. In this case as well, a simple design is carried out with only a few changes in order to adapt the transmission device to the respectively prevailing transmission ratio.

Finally, it may be provided within the scope of a further embodiment of the invention that the ring gear of the second planetary gear set is specified for the first transmission ratio and/or the second transmission ratio, and the ring gears of both planetary gear sets are specified for the third transmission ratio. In other words, the ring gear of the first planetary gear set is rotatably mounted for the first transmission ratio and/or the second transmission ratio. For example, it is coupled to the planetary gear carrier of the second planetary gear set. In addition, the ring gear of the first planetary gear set can be connected to the second shifting shaft. In contrast, both ring gears of the planetary gear sets should be specified for the third transmission ratio.

BRIEF DESCRIPTION OF THE DRAWINGS

The disclosure is explained in more detail in the following by means of exemplary embodiments, without limiting the disclosure. The following is shown.

DETAILED DESCRIPTION

Figure 1:
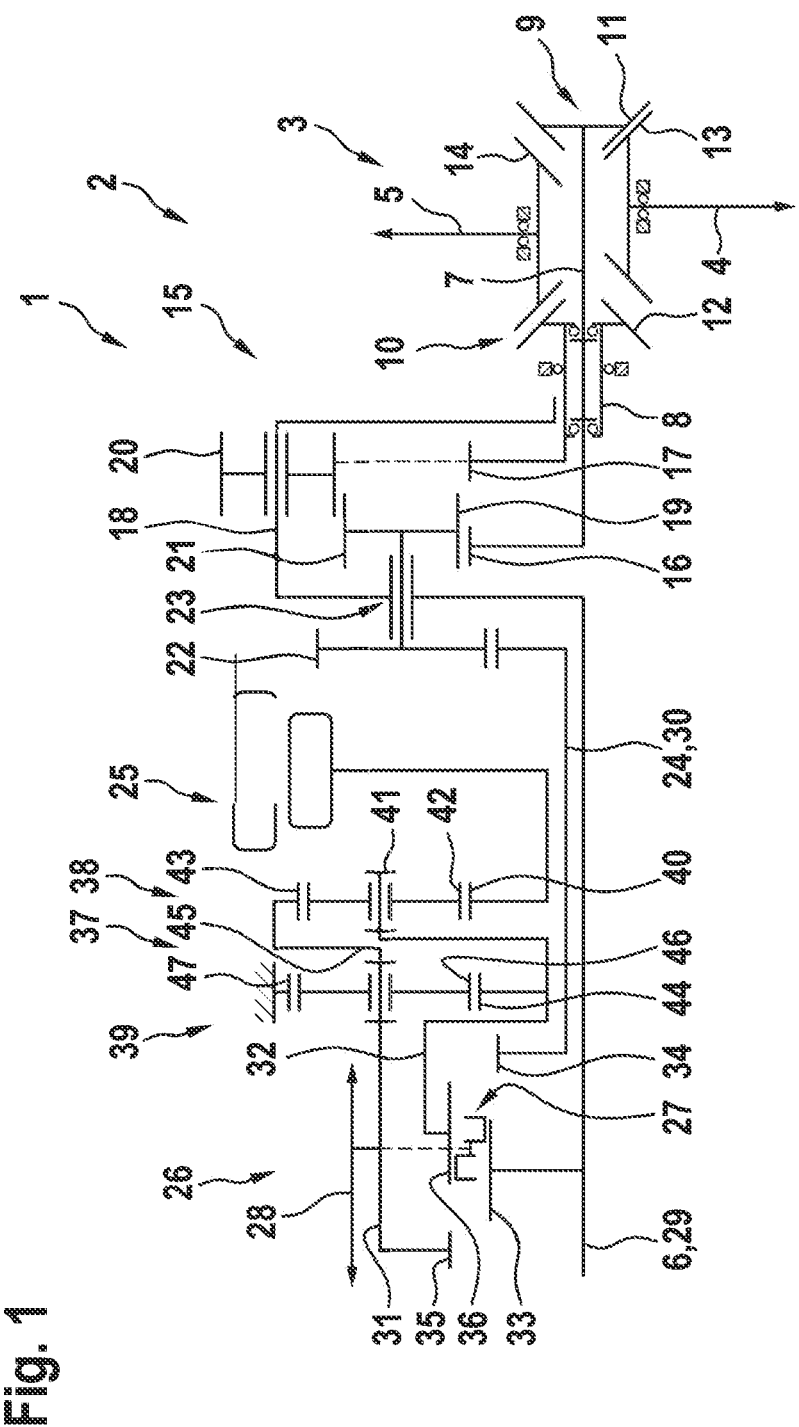
FIG. 1 a transmission device implementable by means of an assembly set in a first embodiment.

FIG. 1 shows a schematic representation of a first embodiment of a transmission device 1, which is provided here, for example, as a component of a motor vehicle 2, which is not shown in detail. The motor vehicle 2 has a wheel axle 3 with a first sub-shaft 4 and a second sub-shaft 5. The wheel axle 3 and/or sub-shafts 4 and 5 can be driven via the transmission device 1 by means of a drive device of the motor vehicle 2. The drive device in this case is operatively connected or at least can be operatively connected to an input shaft 6 of the transmission device 1. In contrast, the first sub-shaft 4 is connected to a first output shaft 7; the second sub-shaft 5 is connected to a second output shaft 8 of the transmission device 1 and/or operatively connected to the respective output shaft 7 or 8.

The operative connection between the first sub-shaft 4 and the first output shaft 7 is established via a first transmission 9; the operative connection between the second sub-shaft 5 and the second output shaft 8 is established via a second transmission 10. Transmissions 9 and 10 may be implemented in the form of angle-type gears. In this case, they are preferably designed as a bevel gear and, in this regard, each have a first bevel gear 11 or 12 and a second bevel gear 13 or 14. According to the embodiment of the transmission device 1 provided in this case, sub-shafts 4 and 5 and/or the axes of rotation thereof are offset to one another in the lateral or radial direction with respect to the axes of rotation. Alternatively, sub-shafts 4 and 5 may also, however, be arranged coaxially with respect to one another, i.e. flush with one another at least in the top view.

The output shafts 7 and 8 may be angled with respect to sub-shafts 4 and 5 and/or the wheel axle 3, at an angle of greater than 0° and less than 180°, for example at an angle of 90° with respect thereto. The corresponding deflection is implemented by means of transmissions 9 and 10, which are present in the form of the angle-type gears. Of course, transmissions 9 and 10 may alternatively be implemented as spur gear transmissions. For example, output shafts 7 and 8 here are arranged parallel to sub-shafts 4 and 5.

The transmission device 1 has a spur gear differential transmission 15, by means of which the first output shaft 7 and the second output shaft 8 are permanently operatively connected and/or coupled to the input shaft 6. To this end, the spur gear differential transmission 15 is designed as a planetary transmission, which has a first sun gear 16, a second sun gear 17, as well as a planetary gear carrier 18, on which a first planetary gear 19 and a second planetary gear 20 are each respectively rotatably mounted. In this case, the planetary gear carrier 18 is coupled to the input shaft 6 of the transmission device 1, particularly rigidly and/or permanently. In contrast, the first sun gear 16 is coupled to the first output shaft 7 and the second sun gear 17 is coupled to the second output shaft 8, preferably rigidly and/or permanently in each case. The first planetary gear 19 engages the second planetary gear 20, namely preferably permanently. In addition, the first planetary gear 19 engages the first sun gear 16 but not the second sun gear 17. In contrast, the second planetary gear 20 engages the second sun gear 17 but not the first sun gear 16.

The first planetary gear 19 is designed as a first multi-stage planetary gear 21, which is non-rotatably connected to a second multi-stage planetary gear 22. The two multi-stage planetary gears 21 and 22 are jointly rotatably mounted on the planetary gear carrier 18, wherein they are preferably situated on the opposite sides of a bearing point 23 on the planetary gear carrier 18. The second multi-stage planetary gear 22 is non-rotatably connected to an intermediate shaft 24, particularly rigidly and/or permanently. It can easily be seen that the two output shafts 7 and 8 as well as the input shaft 6 and the intermediate shaft 24 are arranged coaxially to one another, i.e. they have the same axis of rotation. In this case, the second output shaft 8 occupies the first output shaft 7 at least in areas; the intermediate shaft 24 likewise occupies input shaft 6 at least in areas. In addition, it should especially be emphasized that the spur gear differential transmission 15 is designed without ring gear, i.e. does not have a ring gear.

The transmission device 1 has an electric machine 25, which can be coupled to the input shaft 6 and/or the intermediate shaft 24 by means of a shift device 26. In this case, the shift device 26 has a coupling element 27, which can be extended in the axial direction according to the double arrow 28. The shift device 26 has a first shifting shaft 29, a second shifting shaft 30, a third shifting shaft 31, as well as a fourth shifting shaft 32. The first shifting shaft 29 is formed, for example, by the input shaft 6, and the second shifting shaft 30 is formed by the intermediate shaft 24, respectively, at least in areas. Each of the shifting shafts 29, 30, 31, and 32 has a switching gear 33, 34, 35, and/or 36 with external toothing, which is rigidly and permanently connected to the respective shaft 29, 30, 31, and/or 32. It accordingly applies that switching gear 33 is non-rotatably coupled to input shaft 6, and switching gear 34 is non-rotatably coupled to intermediate shaft 24, namely permanently.

Switching gears 35 and 36, on the other hand, are each connected to the electric machine 25, preferably likewise non-rotatably and permanently. For example, the connection between the electric machine 25 and the shift device 26 and/or switching gears 35 and 36 is established via a planetary gear coupler 37. It has two planetary gear sets 38 and 39 coupled to one another. Planetary gear set 38 has a sun gear 40, a planetary gear carrier 41 with planetary gear 42 rotatably mounted thereon, as well as a ring gear 43. Planetary gear set 39 additionally has a sun gear 44, a planetary gear carrier 45 with a planetary gear 46 rotatably mounted thereon, as well as a ring gear 47. Planetary gear 42 engages with sun gear 40 and ring gear 43, and planetary gear 46 engages with sun gear 44 and ring gear 47.

It can be seen that the ring gear 47 is specified, for example, with respect to a transmission housing of the transmission device 1. Switching gear 35 is coupled to planetary gear carrier 41 as well as sun gear 44, namely rigidly and permanently. In contrast, switching gear 36 is coupled to planetary wheel carrier 45, likewise rigidly and permanently, with the aid of the planetary gear coupler. Different transmission ratios can be implemented between the electric machine 25, on the one hand, and the switching gears 35 and 36, on the other hand, with the aid of the planetary gear coupler 37.

For the transmission device 1, a certain transmission ratio is established between output shafts 7 and 8, on the one hand, and sub-shafts 4 and 5, on the other hand. For other embodiments of the transmission devices 1, other transmission ratios are established, namely, for example, a second transmission ratio or a third transmission ratio, which are different from the first transmission ratio and from each other. As a whole, three different transmission ratios are addressed in this description, which are characterized as the first transmission ratio, second transmission ratio, and third transmission ratio. The planetary gear carrier 41 of the first planetary gear set 38 is intended to be coupled to the sun gear 44 of the second planetary gear set 39 for each of the transmission ratios. In addition, the fourth shifting shaft 32 is coupled to the aforementioned elements, namely preferably rigidly and/or permanently. Furthermore, the electric machine 25 is intended to be connected to the planetary gear coupler 37 via the sun gear 40 for each of the transmission ratios. This means that the sun gear 40 always has the same rotational speed as the electric machine 25.

With the first transmission ratio present in this case, the ring gear 43 of the first planetary gear set 38 is intended to be coupled to the planetary gear carrier 45 of the second planetary gear set 39. The third shifting shaft 31 is likewise intended to be coupled to the ring gear 43 of the first planetary gear set 38 and to the planetary gear carrier 45 of the second planetary gear set 39, namely rigidly and/or permanently. It should be noted that, for the first transmission ratio present here, planetary gear sets 38 and 39 of the transmission gearing 37 have standard transmission ratios. In addition, it should be noted that the ring gear 47 of the second planetary gear set 39 is specified.

It is provided that the coupling element 27 can be arranged in different shift positions. In a first shift position of the coupling element 27, it is preferably provided that the electric machine 25 is connected to the input shaft 6 via the coupling element 27. In contrast, in a second shift position, the electric machine 25 is intended to be coupled to the intermediate shaft 24 in order to implement a torque vectoring functionality. In a third shift position, the electric machine 25 is intended to be coupled to the input shaft 6 such that a transmission ratio is present between the electric machine 25 and the input shaft 6 which is different than in the first shift position.

In contrast, in a fourth shift position, it may be provided that the electric machine 25 is decoupled from both the input shaft 6 as well as from the intermediate shaft 24. With the embodiment of the coupling element 27 described herein, it is preferably provided that it engages switching gears 33 and 36 in the first shift position. In contrast, it is intended to engage switching gears 34 and 36 in the second shift position and switching gears 33 and 36 in the third shift position. In the fourth shift position, for example, it only engages one of switching gears 35 and 36.

Figure 2:
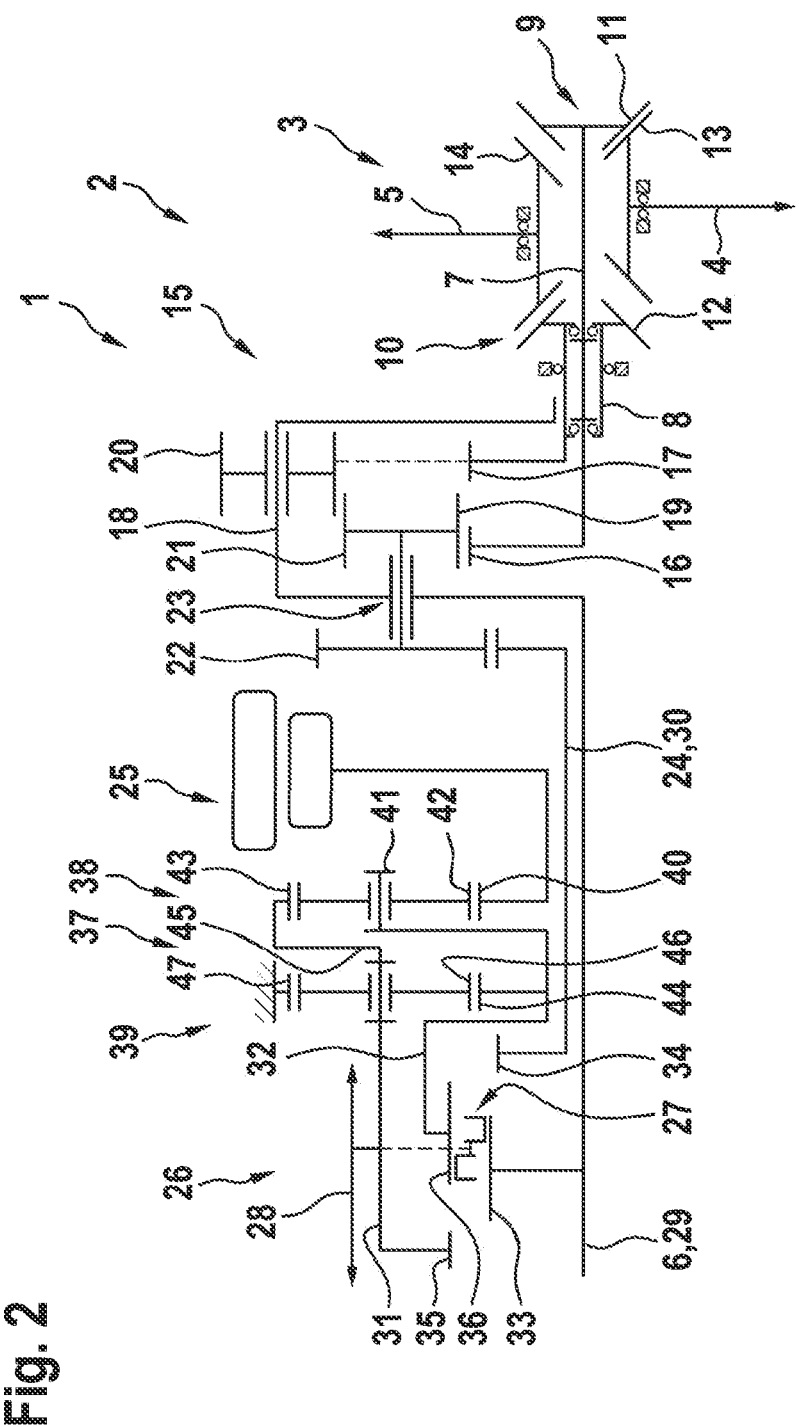
FIG. 2 the transmission device also implementable by means of the same assembly set in a second embodiment; as well as FIG. 3 a third embodiment of the transmission device, which is likewise produced and/or mounted by means of the same assembly set.

FIG. 2 shows a second embodiment of the transmission device 1, which can be implemented with the same assembly set, by means of which the first embodiment of the transmission device 1 is also assembled. The two embodiments of the transmission device 1 differ with respect to the transmission ratio. The first transmission ratio is for the first embodiment and the second transmission ratio is for the second embodiment. In order to adapt the transmission device 1 to the changed transmission ratio, it is provided to only modify the transmission gearing 37. Essentially, the transmission device 1 according to the second embodiment of the transmission device 1 corresponds to its first embodiment such that reference is made to the previous designs and subsequently only the differences are addressed. This is because the two planetary gear sets 38 and 39 of the transmission gearing 37 have the same standard transmission ratios in terms of magnitude. For example, the standard transmission ratios can be negative.

Figure 3:
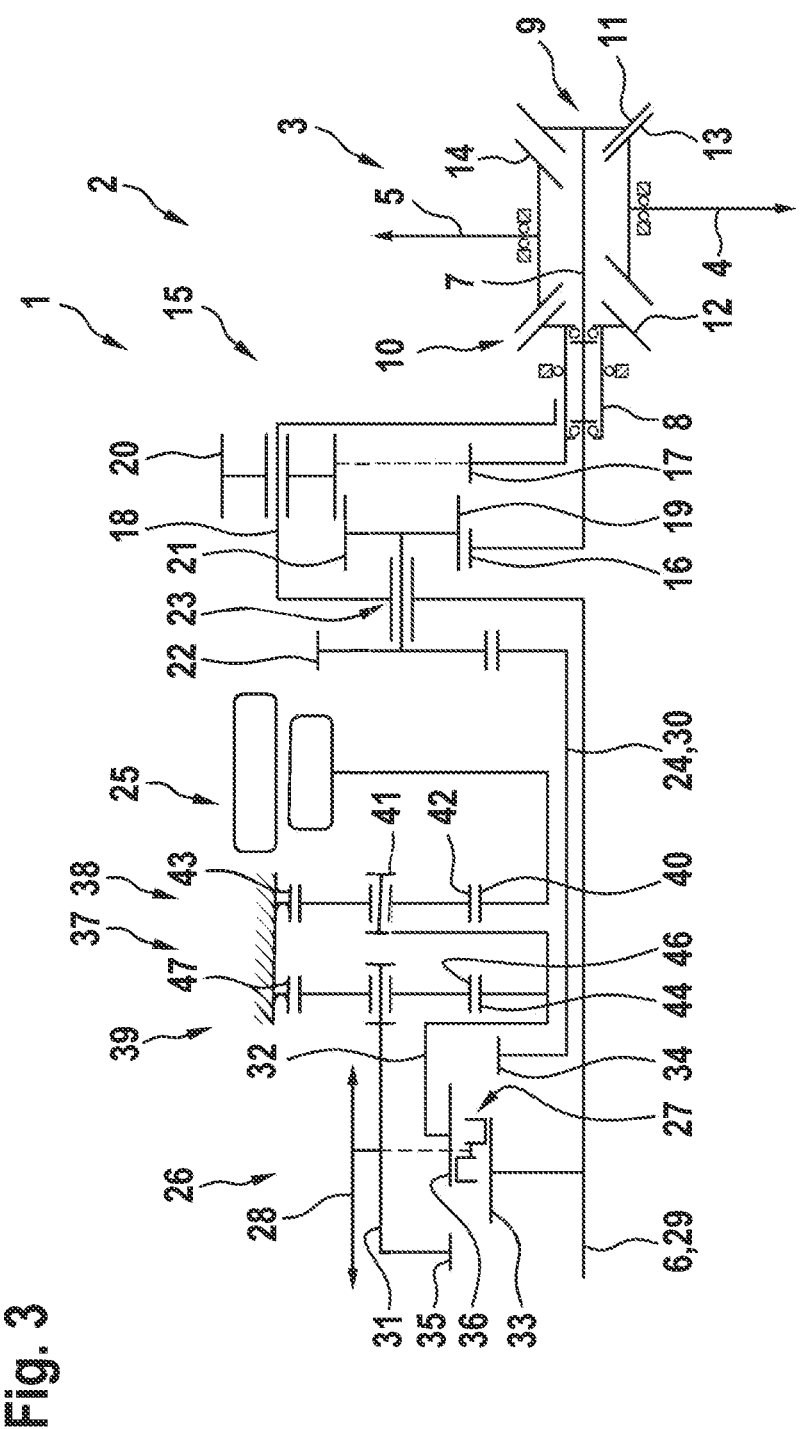

FIG. 3 shows a third embodiment of the transmission device 1, which, in turn, is implemented by means of the same assembly set. In the third embodiment, there is a third transmission ratio, which is different from both the first transmission ratio as well as from the second transmission ratio. Once again, only the transmission gearing 37 is adapted in order to adapt the transmission device 1 to the modified transmission ratio. Reference is made to the previous designs of the first embodiment and the second embodiment and subsequently only the differences are addressed. The reason for this is that only and/or exclusively the first shifting shaft 31 is coupled to the planetary gear carrier 41 of the first planetary gear set 38. Just as with the second transmission ratio, which relates to the second embodiment, the standard transmission ratios of the two planetary gear sets 38 and 39 are identical in terms of magnitude. In contrast with the first two embodiments, ring gears 43 and 47 of both planetary gear sets 38 and 39 should be defined with the third embodiment.

As a whole, it is shown that the transmission devices 1 can be adapted, easily and with low design complexity, to different transmission ratios by simply varying the transmission gearing 37 such that the assembly set, which is used to produce the transmission devices 1, can have a large number of similar parts. Thus, particularly the spur gear differential transmission 15 is identical for all transmission devices 1 implemented by means of the assembly set.

The invention claimed is:

1. A modular transmission device for a motor vehicle, comprising
an input shaft which is operatively connectable to a drive device of the motor vehicle,
a hollow, rotatable intermediate shaft through which the input shaft passes,
a first and a second output shaft, which are each coupleable to a respective sub axle of a wheel axle of the motor vehicle,
a spur gear differential transmission, configured as a planetary transmission, which couples the input shaft and the intermediate shaft to the first and second output shafts, and
an electric machine which is coupleable to the input shaft and the intermediate shaft via a shift device,
wherein a modular transmission gearing comprising at least two planetary gearsets is interposed between the electric machine and the shift device and couples the electric machine to the shift device, and
wherein, in a first position of the shift device, the input shaft is coupled to the electric machine, and, in a second position of the shift device, the intermediate shaft is coupled to the electric machine.

2. The modular transmission device of claim 1, wherein the electric machine is coaxial with the input shaft and the intermediate shaft.

3. The modular transmission device of claim 2, wherein the input shaft and the intermediate shaft each pass through the electric machine.

4. The modular transmission device of claim 1, wherein the at least two planetary gearsets each comprise a sun gear, a planetary gear carrier with planetary gears rotatably mounted thereon, and a ring gear.

5. The modular transmission device of claim 4, wherein the planetary gear carrier of a first of the at least two planetary gearsets is rigidly coupled both to the sun gear of a second of the at least two planetary gearsets and to the shift device.

6. The modular transmission device of claim 4, wherein the electric machine is rigidly coupled to the modular transmission gearing via the sun gear of a first of the at least two planetary gearsets.

7. The modular transmission device of claim 4, wherein the ring gear of a first of the at least two planetary gear sets is rigidly coupled to the planetary gear carrier of a second of the at least two planetary gearsets.

8. The modular transmission device of claim 4, wherein the ring gear of one or more of the at least two planetary gearsets is rigidly connected to a transmission housing.

9. The modular transmission device of claim 4, wherein the ring gears of two of the at least two planetary gearsets are rigidly connected to a transmission housing.

10. The modular transmission device of claim 4, wherein the sun gear of a second of the at least two planetary gearsets is rigidly coupled to the shift device and thereby directly coupleable to the input shaft or the intermediate shaft.

11. The modular transmission device of claim 4, wherein the shift device comprises:
a first shifting shaft rigidly coupled to the input shaft;
a second shifting shaft rigidly coupled to the intermediate shaft;
a third shifting shaft rigidly coupled to the modular transmission gearing, and
a fourth shifting shaft rigidly coupled to the modular transmission gearing.

12. The modular transmission device of claim 11, wherein the third shifting shaft is rigidly coupled to the ring gear of a first of the at least two planetary gearsets and to the planetary gear carrier of a second of the at least two planetary gearsets.

13. The modular transmission device of claim 11, wherein the fourth shifting shaft is rigidly coupled to the planetary gear carrier of a first of the at least two planetary gearsets.

14. The modular transmission device of claim 1, wherein the first output shaft is hollow and the second output shaft passes therethrough.

* * * * *